United States Patent [19]
Devlin

[11] 3,807,666
[45] Apr. 30, 1974

[54] CONTROL WHEEL STEERING SYSTEM FOR AIRCRAFT AUTOMATIC PILOTS

[75] Inventor: Bernard T. Devlin, Phoenix, Ariz.

[73] Assignee: Sperry Rand Corporation, Great Neck, N.Y.

[22] Filed: June 11, 1973

[21] Appl. No.: 369,018

[52] U.S. Cl. ......... 244/77 M, 235/150.2, 244/77 E, 244/77 V, 244/77 SE, 318/564, 318/591
[51] Int. Cl. ............................................. B64c 13/18
[58] Field of Search..... 235/150.2; 244/77 M, 77 V, 244/77 SE, 77 D, 77 E, 83 E; 318/563–564, 584–585, 591

[56] References Cited
UNITED STATES PATENTS

| | | | |
|---|---|---|---|
| 3,156,855 | 11/1964 | Righton et al................ | 244/77 M X |
| 3,386,689 | 6/1968 | Parker et al...................... | 244/77 M |
| 3,521,839 | 7/1970 | Diani................................ | 244/77 SE |
| 3,682,417 | 8/1972 | Burklund et al............. | 244/77 SE X |
| 3,730,461 | 5/1973 | Knemeyer.................... | 244/77 SE X |

Primary Examiner—Trygve M. Blix
Assistant Examiner—Stephen G. Kunin
Attorney, Agent, or Firm—Howard P. Terry

[57] ABSTRACT

Aircraft control wheel steering (cws) apparatus having a pair of force sensors coupled to the pilot control wheel for providing redundant command signals to respective independent cws control channels operatively associated with a single axis of the aircraft. Each control channel operates in a synchronizing mode to cancel the applied input command signal until both command signals exceed a predetermined threshold level and thereafter the command signals are applied to the aircraft control surface actuators through the autopilot integrator. Upon reaching a predetermined maneuver limit signal level in either channel, or upon reduction of the control wheel force to a level below the threshold, the command signals are decoupled from the autopilot integrator and both cws control channels revert to the synchronizing mode of operation.

10 Claims, 3 Drawing Figures

CONTROL WHEEL STEERING SYSTEM FOR AIRCRAFT AUTOMATIC PILOTS

BACKGROUND OF THE INVENTION

1. Field of the Invention

The invention described herein relates generally to aircraft automatic flight control systems and more particularly to improvements in control wheel steering apparatus adapted for use with flight control systems which include redundant channels for controlling an aircraft about its pitch and roll axes.

2. Description of the Prior Art

Control wheel steering apparatus incorporated as part of an aircraft automatic control system affords a pilot the advantage of steering wheel feel type control in preference to the use of panel mounted knobs for introducing pitch and roll attitude maneuver commands. Prior to the last few years, however, such apparatus had generally been used only in helicopter type aircraft or highly maneuverable military aircraft. More recently, though, control wheel steering apparatus has been adapted for use in large commercial transport aircraft and more sophisticated military transport and surveillance aircraft. The autopilot systems in these aircraft typically include means for providing aircraft control surface position and aircraft attitude and attitude rate feedback signals so that the aircraft attitude is stabilized in pitch and roll in all operating modes including automatic flight path modes and cws mode. Flight path control signals may be provided for instance by inertial references, air data references and/or VOR during normal cruise flight or by ILS radio beam during automatic approach and landing. The control wheel steering apparatus may be used at any time that the pilot wishes to over-ride the automatic flight path controls and assume direct control of the aircraft. In the following specification and claims, the term "autopilot mode" will be understood to include not only flight path control modes but also simple attitude hold modes, such as roll, pitch and heading hold.

Three types of control wheel steering have been used extensively in the past few years. In one type of system, the direct stick-to-surface control of the primary flight control system is used, and the autopilot merely reverts to its disengage synchronization configuration during the maneuver and re-engages when the control wheel or stick is force centered. The present invention does not apply to this type of system.

In a second type of system, force sensors coupled to the control wheel or stick apply a force-proportional signal directly to the autopilot servo system. If the autopilot is in a stability augmentation mode (attitude rate feedback only), aircraft attitude rate changes are commanded proportional to stick force. If an outer loop mode (say attitude hold) is engaged, an outer loop displacement reference change proportional to force is commanded for low force levels. For forces above the detent level, the attitude reference is synchronized and an aircraft attitude rate change proportional to force is commanded. The inherent transient caused by the attitude synchronization is a major disadvantage of this system. The present invention applies to this type of system only if a dead zone is desired or acceptable. This is true because with no dead zone the sensor inputs are active at all times, including pre-engage synchronization, so that sensor nulls are effectively synchronized. Since sensor outputs are then active for any low level input, no pre-synchronization of low level non-linear gradients is possible.

The third type of system was designed explicitly for a system that has no stability augmentation or rate damping only mode; that is, the basic mode of the autopilot when initially engaged is attitude or flight path angle hold. All present day commercial transports are of this configuration, as are certain sophisticated military aircraft, especially when derived from commercial aircraft. In this type of system, a force-proportional signal is applied via a dead zone to an integrator in the autopilot to adjust the attitude reference at a rate proportional to force for input levels above the dead zone. This technique eliminates the attitude synchronization transients described for the second type system. It is known in the art to include in such systems a direct feed path, a so-called boost path, in parallel with the integrator to minimize the lag of the aircraft response relative to input command. This prevents the airplane from continuing to rotate after the force has been released at a desired attitude. A system of this basic type is described in U.S. Pat. No. 3,386,689 issued June 4, 1968 to R. H. Parker et al. and assigned to the assignee of the present invention. The present invention applies directly to this type of system when used in a dual or multichannel configuration. The trend in recent years, irrespective of the operational characteristics of the autopilot involved, has been toward the use of redundant control channels for the purpose of achieving enhanced safety and reliability. This is particularly true in the case of all weather systems for large commercial transport aircraft and in military aircraft with sustained low altitude missions. For instance, in the case of roll control, two or more identical channels are operated in parallel to provide control signals to the surface actuators for changing the attitude of the craft about its longitudinal axis and likewise in the case of pitch control about the lateral axis of the aircraft. It is essential in the case of these redundant control systems that the respective channels track one another to assure equivalence of the signals applied to the surface actuators, and it is specifically to this matter that the present invention is addressed. As is known to those skilled in the art, at low force levels applied to a control wheel the sensors coupled thereto are likely to provide unequal output signals because of inherently different null output levels, unbalanced coupling to the control wheel, and differential voltage versus force gradients. At higher levels of force inputs, however, the voltage versus force gradients can be adequately matched. In any event, to assure proper actuation of an aircraft's control surfaces it is necessary somehow to correct for or eliminate the occurrence of differential signal levels in redundant control channels. Null compensation may be provided by means of respective sensor bias signals algebraically combined with each force sensor output signal in the manner described in the above-mentioned Parker et al patent. This approach is considered unsuitable, however, since it provides the required compensation only for a particular combination of force sensor and control channel equipment and therefore requires periodic on-board adjustment. Moreover, this method cannot compensate for non-linear gradients, control linkage non-linearities, or asymmetry in the detent and dead zone electronics. Equalization or balancing between the channels is acceptable to compensate for long term minor differences, but must be limited to prevent cross-coupling of failures without detection.

SUMMARY OF THE INVENTION

The present invention relates to improvements in control wheel steering apparatus used with redundant control channel autopilot systems for overcoming the aforementioned limitations or disadvantages of prior art systems. In accordance with the invention, each cws control channel provides means for cancelling the input command signal until both command signals reach a predetermined detent level whereupon the cancelling signals are clamped and further increases of the command signals are then coupled through the respective autopilot control channels and autopilot integrator to the aircraft control surface actuators until force is reduced below the detent level or the commanded attitude signal in either channel reaches a level corresponding to a predetermined maneuver limit. At the maneuver limit, the control wheel input command signals are decoupled from the integrator and the cws control channels synchronize to cancel the command signals. More specifically, in a preferred embodiment of the invention, each cws control channel includes a detent detector connected to receive a signal from a respective force sensor coupled to the control wheel, a synchronizer, and a maneuver limit detector. The detent detectors are each responsive to an identical predetermined signal level. At force sensor output signal levels below the detent thresholds, the synchronizers of both control channels are engaged to generate feedback signals which cancel the force sensor output signal applied to the related control channel and the synchronizer outputs are decoupled from the autopilot integrator. Each synchronizer continues to generate a feedback signal which cancels the applied force sensor output until both force sensor output signals exceed their detent thresholds, at which instant the synchronizers are disengaged and the synchronizer outputs are coupled to the autopilot integrator. Since each synchronizer continues to function until both force sensor output signals reach the detent threshold it is assured that both control channels supply an output signal to the integrators commencing at or close to zero at the instant both detent detectors have been actuated and thereafter substantially track one another. In the case of the maneuver limit detectors, logical OR circuits are employed to decouple the synchronizer outputs from the integrator and re-engage the synchronizers to generate a feedback signal which cancels the associated force sensor input signal when the attitude signal command of either control channel reaches a predetermined maneuver limit. As a consequence of such action, the aircraft will assume a bank angle, in the case of a roll command input applied to the control wheel, corresponding to the roll attitude maneuver limit and remain at that attitude even though the pilot may continue to apply a roll command force to the control wheel. In other words, after reaching the maneuver limit the aircraft will remain at a fixed roll angle for as long as the pilot continues to apply an input force calling for a roll attitude in the same direction and will so remain even after the control wheel has been returned to a neutral position. Moreover, when the control wheel returns to neutral and the output signals of both force sensors return to a value below the detent level, the pilot input command will remain decoupled from the integrator and the synchronizers will remain operative to hold the synchronizer output at zero. A change in roll attitude back to zero roll or a roll in the opposite direction is achieved only by the pilot turning the control wheel in the opposite direction and thereafter the operation proceeds in the manner explained above for the first commanded direction of roll.

DESCRIPTION OF THE PREFERRED EMBODIMENT

Figure 1:
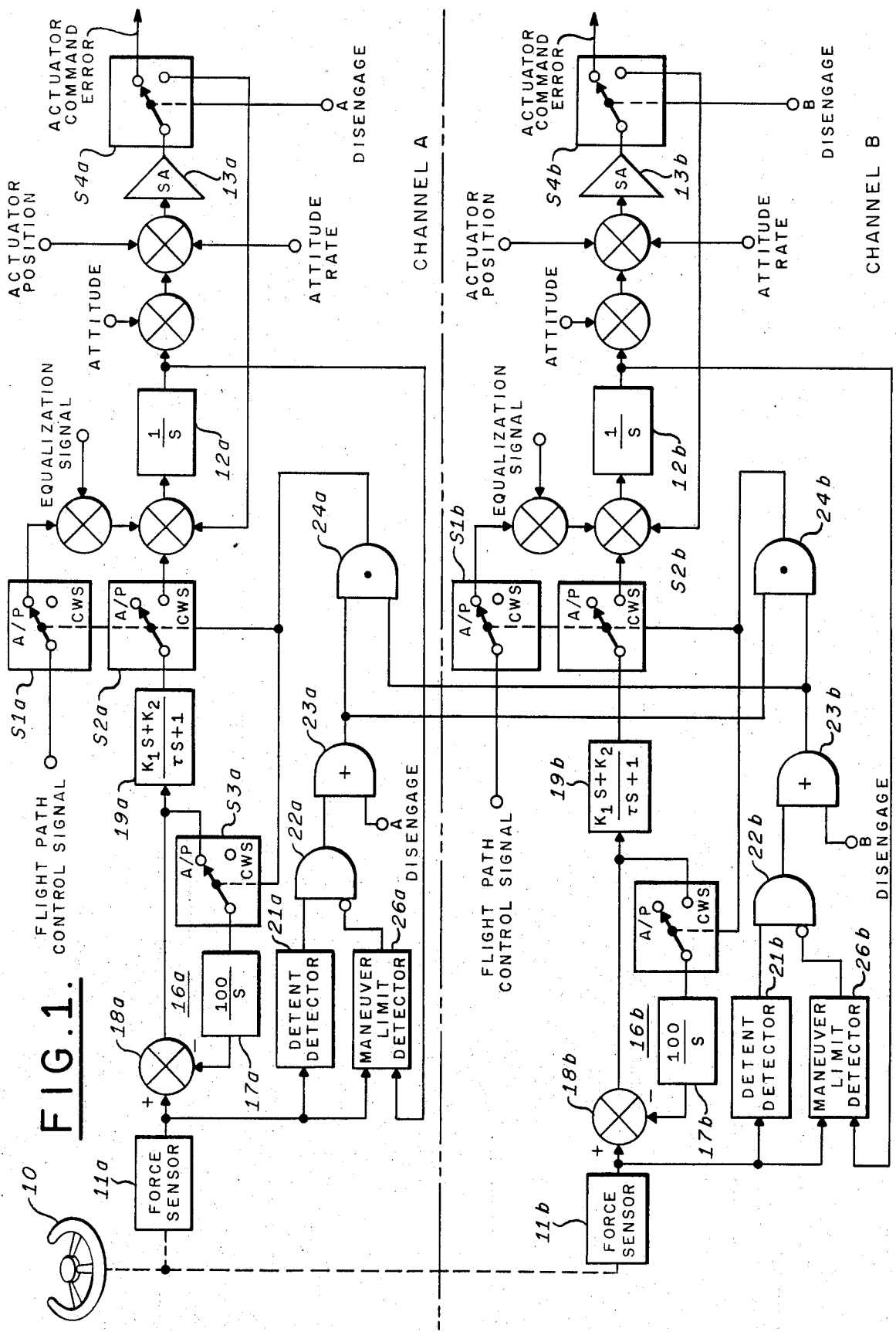
FIG. 1 is a block diagram of a dual channel control system embodying the principles of the present invention.

Referring to FIG. 1, the invention will be described with reference to a dual channel control system comprising identical channels A and B incorporated in an aircraft automatic pilot system for controlling the roll attitude of an aircraft. The illustrative embodiment and principles of the invention are, of course, also applicable for controlling the pitch attitude of an aircraft. Inasmuch as channels A and B are identical, the description and mode of operation of the invention will be given principally with reference to channel A, and channel B will be referred to only when necessary for clarifying the description and pointing out the co-active relationship between the channels.

The pilot control wheel 10 has a pair of input force sensors 11a and 11b coupled to it for providing command signals to the input of channels A and B respectively. The force sensors may, for example, be of the strain guage type shown in U.S. Pat. No. 3,703,267, assigned to the same assignee as the present invention, or of the E pickoff type as explained in the aforementioned Parker et al patent to provide an a.c. signal having an amplitude proportional to the force applied to the control wheel and phase dependent upon the direction of the force. When the autopilot system is operating in an automatic guidance mode with the control wheel at a neutral position, flight path control signals are introduced through switches S1a and S1b to respective summing junctions coupled to the input of autopilot integrators 12a and 12b in channels A and B. Limited equalization signals are also coupled to both channels along with the flight path control signals to compensate for long term differences in the commands provided at the input to the servo-amplifiers 13a and 13b of the respective channels. For a more detailed description of the nature and function of the equalization signals, reference may be made to U.S. Pat. No. 3,462,661 issued Nov. 25, 1966 to R. A. Nelson and assigned to the instant assignee. The conventional attitude and attitude rate feedback signals are also applied to both channels as indicated along with control surface and surface actuator position feedback signals as explained in the aforementioned Parker et al. patent. Thus, in the absence of control wheel steering or flight path control input signals, the aircraft is stabilized at zero roll attitude, short term stability augmentation being provided by the attitude rate signals in conventional fashion. The actuator error output signals are applied to an autopilot actuator and the servo loop is closed by feeding back actuator position. This configuration assumes that mechanical voting is used downstream of the autopilot actuators, rather than electronic voting upstream of a common actuator as is employed in some existing systems. In the case of roll control, the surface command signals are applied with one polarity to an actuator or actuators associated with one wing of the aircraft and applied with the opposite polarity to an actuator or actuators associated with the other wing of the aircraft whereas for pitch control surface command signals of the same polarity are applied to the respective actuator.

Figure 2:
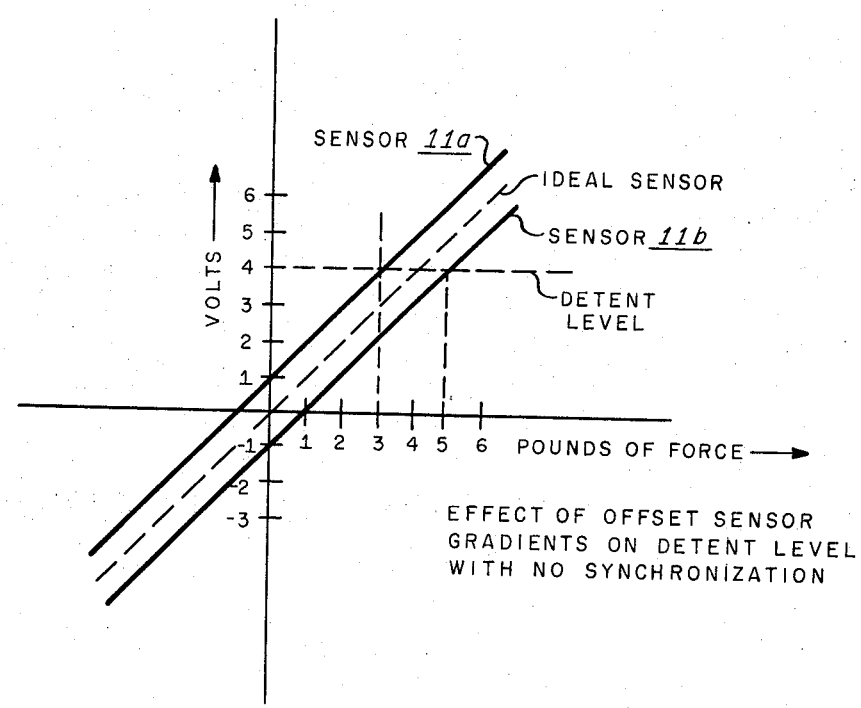
FIGS. 2 and 3 are respective voltage versus force and attitude versus time diagrams which are useful in explaining the operation of the system of FIG. 1.

When the pilot desires to manually control or change the roll attitude of the craft, he does so by applying a turning force to the control wheel in the direction of the desired roll. Force sensors 11a and 11b are characterized by a voltage versus force gradient as shown in FIG. 2. As explained hereinbefore, these gradients are likely to be non-linear and unequal below a certain force level while above that level the gradients will generally be equal. In any case, the signal output levels of the respective force sensors would, of course, normally remain unequal in the absence of the present invention as a result of the initial unbalance around the neutral position of the control wheel. The dash line passing through the origin of FIG. 2 represents an ideal case where both force sensors provide zero volts output at zero applied force and equal output voltages for all other values of applied force. Such ideal conditions are not realized, however, in actual practice due to manufacturing and/or installation tolerances. A case selected for the purpose of describing the present invention illustrates force sensor 11a as providing an output which changes linearly from +1 volt at zero pounds of force while force sensor 11b provides an output signal which changes linearly from −1 volt at zero pounds of force, the non-linear response of the force sensors in the region around zero force not being shown in the drawings. As previously mentioned, the force sensor output voltages are positive for one direction of pilot force applied to the control wheel and negative for the opposite direction of applied force.

The object of the inventive apparatus is to preclude the force sensor signals from being applied to the related integrator 12a or 12b until both force sensor signals reach a predetermined detent (threshold) level and then apply the pilot force signals to the integrators with the signals in both channels commencing at or close to zero volts at the instant of application. Operation in this manner eliminates the majority of the mismatch in the cws signals and therefore also eliminates the need for excessive equalization or balancing between channels. Synchronizers 16a and 16b perform this function. Below the detent levels, switches S1a, S1b, xS2a, S2b, S3a, and S3b are in the autopilot (A/P) position as indicated in the drawing. Hence, control wheel force signals are not applied to integrators 12a and 12b when the control wheel is at or near a neutral position and each synchronizer produces a signal via a high gain integrator 17a, 17b which is degeneratively combined with the applied force sensor signal in summing junctions 18a and 18b respectively. Thus, the synchronizer outputs applied to the respective lead-lag networks 19a, 19b are held at zero.

When the output signal of force sensor 11a reaches the predetermined detent level, for example +4 volts (See FIG. 2), detent detector 21a, which may be a conventional threshold detection circuit, feeds a threshold indicative signal through inhibitor 22a and OR gate 23a to AND gates 24a and 24b. At this instant the signal out of force sensor 11b has reached only +2 volts in the example and synchronizers 16a and 16b continue to operate in a manner to hold the synchronizer outputs at zero. As the pilot continues to increase the force applied to the control wheel, synchronizers 16a and 16b continue to maintain the voltages at the outputs of summing junctions 18a and 18b respectively at zero volts until the applied force reaches 5 pounds, at which point the output signal of force detector 11b also reaches the 4 volt detent level. Then, detent detector 21b provides a threshold indicative signal through the data input terminal of inhibitor 22b and OR gate 23b to AND gates 24a and 24b. Under this condition both AND gates receive input signals from OR gates 23a and 23b. Each of the AND gates therefore provides an output signal to cause switches S1a, S1b, S2a, S2b and S3a, S3b to switch to the cws position whereupon synchronizers 16a, 16b are disengaged, the flight path control signals are disconnected, and the control wheel force signals are applied through the lead-lag networks to autopilot integrators 12a, 12b of the respective channels. Thereafter, for as long as the control wheel force is maintained above the detent level in the same direction, the integrator outputs continue to provide an increasing commanded attitude signal up to a predetermined maneuver limit. It should be appreciated that operation in the above-described manner, whereby synchronizer 16a continues to cancel the output signal of force sensor 11a until the output signal of force sensor 11b reaches the detent level, provides for the signals applied through switches S2a, S2b both to start at zero and change substantially identically for further increases of pilot applied force.

Figure 3:
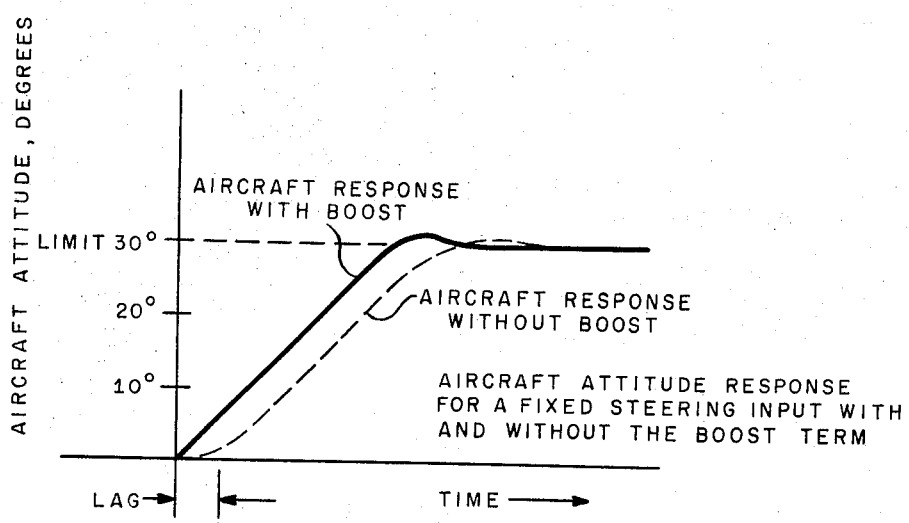

Before proceeding to a detailed discussion of the operation of the maneuver limit circuit, a momentary digression will be made to consider the function of the lead-lag networks as this will enable a better understanding of the maneuver limit operation. The $(K_1S)/\tau S + 1)$ portion of the lead-lag network constitutes a boost term in the manner of the boost term fed around, that is in parallel with, integrator in the aforedescribed prior art systems for the purpose of minimizing the lag of the aircraft response to the pilot commands. By placing the boost term in the control channels at a point preceding the integrator inputs, more accurate maneuver limit detection is obtained by virtue of the fact that the signal used for maneuver limit detection contains the boost signal. In the absence of a boost term being incorporated in the illustrative rate type command system, either preceding or in parallel with the integrator, the aircraft response for a pilot applied step input force signal is as illustrated in FIG. 3. By the provision of the boost signal, the initial lag of the aircraft response to the command input is substantially eliminated and the aircraft response curve moves into coincidence with the command characteristic. Perfect coincidence of the aircraft response and command signals is obtained of course only for a selected median airspeed unless the boost signal is made a function of airspeed. In any case, it will be appreciated that a more accurate maneuver limit is achieved by basing the maneuver limit threshold detection on a signal which contains and stores the boost information. The $1/\tau S+1)$ portion of the lead-lag network is provided simply to introduce a slight lag, on the order of three tenths to seven tenths of a second, into the command input to preclude undesired pilot-induced oscillations.

Returning now to a description of the maneuver limit circuits, each maneuver limit detector 26a, 26b receives two inputs, one from the associated control wheel force sensor and the other from the output of the associated integrator 12a or 12b. As explained above, the integrator output is accurately representative of the commanded attitude by virtue of the manner in which the boost term is provided. The force sensor signals function as polarity gating signals applied to the maneuver limit detectors; that is, each maneuver limit detector provides an output signal only when the detent detector thresholds of both channels is exceeded and the applied force sensor and integrator output signals are of appropriate polarity, in other words representative of the same attitude sense, and the integrator output reaches a predetermined limit. Such operation is easily achieved with conventional logic and threshold detection circuits. For instance, assume the maneuver limit is 30 degrees of right or left roll attitude, corresponding to +10 and −10 volts respectively at the output of integrators 12a and 12b. Further assume that the respective positive and negative integrator voltages are produced by corresponding positive and negative force sensor voltages. Then when the output of integrators 12a or 12b reaches the 10 volt level a signal will be produced at the output of the related maneuver limit detector for application to the inhibit input terminal of the associated inhibitor 22a or 22b to block the related force detector output signal from AND gates 24a and 24b. Thus, as soon as the integrator output of either channel reaches the 10 volt maneuver limit, under a simultaneous condition of identical polarity of the force sensor signals applied to the maneuver limit detectors, one of the inputs to the AND gates will be removed from both AND gates. As a consequence switches S1a and S1b will open to the A/P position to reconnect the flight path control signal, switches S2a and S2b will open to remove the pilot commands from the input of integrators 12a and 12b, and switches S3a and S3b will open to re-engage synchronizers 16a and 16b. It should be appreciated that although the operation of synchronizers 16a and 16b below the detent level assures that the pilot input to both integrators starts at the same level as shown in FIG. 2, it is nevertheless possible for one integrator output to reach the maneuver limit ahead of the other because of differential tolerances of the circuit components used in the control channels. The first integrator output to reach the maneuver limit is used as the attitude limit control to aasure that an excessive attitude is not commanded due to a single failure. In other words, an OR function is used for activation of the maneuver limit as opposed to the detent detection which employs an AND function whereby the pilot command is applied through the integrators only after both force sensor signals reach the detent level. Use of the AND function for the detent function minimizes the probability of obtaining a failure resulting in a nose-down maneuver when the pilot does not have his hands on the wheel.

In the event that it may sometimes be desired to disengage one of the control channels, provision is made for bypassing the detent logic from the disengaged channel if desired. This function is provided by the A disengage OR B disengage inputs to OR gate 23a or 23b so that the AND gates receive the required two inputs when the detent level is exceeded only in the channel that is operative. Upon disengaging a channel, the related switch S4a or S4b is switched to the lower contact to remove the actuator command error signal from the control surface actuators and to synchronize the autopilot to zero actuator command.

Finally, it should be understood that more than two channels may be operated in parallel to provide the desired redundancy, in which case all or any combination of two or more of the various channels may be operated in the manner of the above-described dual control channel system.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An aircraft flight control system including first and second redundant control channels, said system being selectively operable in an autopilot mode or a pilot control wheel steering (cws) mode for controlling an aircraft about one of its axes where pilot commands are provided by force sensors coupled with the pilot's control wheel, each sensor being associated with a respective control channel and wherein each control channel comprises synchronizer means coupled to the related control wheel sensor and operable in the autopilot mode to cancel the sensor output signal until the output signals of both sensors reach a predetermined threshold level, detent detector means for detecting the predetermined threshold level of the related control wheel sensor output signal to provide a signal indicative of the detected threshold, and gate means responsive to the simultaneous existence of detected threshold indicative signals in both channels for providing a mode switching signal to switch both channels from the autopilot mode to the cws mode and disengage said synchronizer means which thereafter remains clamped at the level of the control wheel sensor signal applied thereto at the instant of synchronizer disengagement whereby further increases of each control wheel sensor output signal are coupled through the associated flight control system channel to control the aircraft control surface actuators in accordance therewith.

2. The system of claim 1 wherein each synchronizer means comprises summing means having one input connected to receive said force signal and another input, high gain integrator means having its input connected to the output of said summing means and having its output connected to said other input of said summing means, and switch means responsive to said mode switching signal for interrupting said integrator input connection, whereby said integrator output is clamped at the level of said force signal existing at the instant of mode switching.

3. The system of claim 1 wherein each control channel further includes maneuver limit detector means responsive to the simultaneous existence of a signal in the related control channel representative of a predetermined aircraft attitude limit and a signal of the related control wheel sensor representative of a corresponding attitude sense, under a condition of detent detector threshold indicative signals existing in both channels, for providing an inhibit signal to terminate operation of said gate means whereby the related synchronizer means is re-engaged and the respective control channels are switched back to the autopilot mode.

4. The system of claim 3 wherein each synchronizer means comprises summing means having one input connected to receive said force signal and another input, high gain integrator means having its input connected to the output of said summing means and having its output connected to said other input of said summing means, and switch means responsive to said mode switching signal for interrupting said integrator input connection, whereby said integrator output is clamped at the level of said force signal existing at the instant of mode switching.

5. The system of claim 3 wherein the means responsive to the simultaneous existence of detected threshold indicative signals in both channels includes an inhibitor means having a data input terminal for receiving the detent detected threshold indicative signal and an inhibit input terminal for receiving the maneuver limit detector inhibit signal, and an AND circuit coupled to receive the inhibitor output signal of both control channels for providing the mode switching signal.

6. The system of claim 5 wherein each control channel further includes an OR circuit coupled intermediate the related inhibitor output and the input of the AND circuit of both channels, and means for supplying a respective control channel disengage signal to each OR circuit.

7. The system of claim 6 wherein each synchronizer means comprises summing means having one input connected to receive said force signal and another input, high gain integrator means having its input connected to the output of said summing means and having its output connected to said other input of said summing means, and switch means responsive to said mode switching signal for interrupting said integrator input connection, whereby said integrator output is clamped at the level of said force signal existing at the instant of mode switching.

8. The system of claim 1 wherein each control channel comprises integrator means for receiving the cws command signals and providing an output surface command signal to the autopilot actuators whereby the aircraft attitude rate is proportional to the cws force input signals.

9. The system of claim 8 wherein each control channel includes a lead network coupling said force sensor signal to the input of the integrator means for compensating for inherent lag of the response of the aircraft to the pilot input and assuring that the output of the integrator means is closely representative of the instantaneous aircraft attitude.

10. The system of claim 9 wherein each control channel further includes maneuver limit detector means responsive to the simultaneous existence of a signal in the related control channel representative of a predetermined aircraft attitude command limit and a signal of the related control wheel sensor representative of a corresponding attitude command sense, under a condition of detent detector threshold indicative signals existing in both channels, for providing an inhibit signal to terminate the operation of said gate means whereby the related synchronizer means is re-engaged and the respective control channels are switched back to the autopilot mode.

* * * * *